Patented May 22, 1945

2,376,467

UNITED STATES PATENT OFFICE 2,376,467

MANUFACTURE OF METALLIC COMPOUNDS

Clarence Walter Wilson, Norco, Calif., assignor to California Fruit Growers Exchange, Los Angeles, Calif., a corporation of California No Drawing. Application February 18, 1942, Serial No. 431,450

4 Claims. (Cl. 106—308)

This application relates to the manufacture of metallic compounds, including particularly those suitable for pigments, and especially in such form that the pigments are in very finely divided form.

The method of my invention involves the use of pectate sols which are reacted with other compounds to produce in very finely divided form the particular pigment desired.

Accordingly, an object of my invention is to provide methods and means for the manufacture of pigments in finely divided form.

A further object is to utilize the particular properties of pectates to secure precipitated pigments in deflocculated, highly dispersed form.

Other objects, uses, and advantages will be more fully apparent to those skilled in the art from the following description and the appended claims.

As an illustrative example of the practice of my invention, I may refer to the preparation of lead chromate.

Various types of pectates are in existence, as will fully appear from a study of my Patent Re. 21,077. While the practice of my invention is not limited thereto, I prefer to utilize the pectates, the preparation of which is described in my patent aforesaid.

Starting with an aqueous solution of sodium pectate containing ten parts by weight of sodium pectate in four hundred parts by weight of water, I add to the sol ten parts by weight of lead acetate dissolved in a sufficient quantity of water with sufficient stirring to insure adequate intermixture.

A gel of lead pectate is formed which under the conditions outlined is found to have a granular, noncontinuous structure. This gel is thoroughly drained to remove excess water and the sodium acetate formed by the reaction. By suspending the gel in water and boiling, it is possible to purify the lead pectate much more thoroughly. The boiling in water is found to shrink the gel considerably, thereby squeezing out the liquid components thereof from the gel particles, and the interchange of fluid between the exterior and interior of the gel particles will give further purification.

The gel may be drained a second time and washed with additional water.

The gel is then thoroughly pressed in any suitable manner. A type of press in which the lead pectate gel is retained within a filter cloth is satisfactory.

The gel which has been purified to the desired extent is suspended in water and a solution of potassium chromate is added. I prefer in the addition of the potassium chromate not to exceed the stoichiometric proportion which will be required to react with the lead present in the gel. This preference is based on my desire to avoid the presence of excess chromate ion so that, if I desire to repeat the above cycle of reactions with the same material, there will be present no excess chromate ion to react directly with the freshly added lead acetate and thus possibly cause the formation of undesirably large crystals of lead chromate.

At the end of the series of steps which I have described above, lead chromate will exist in very finely divided form in a solution which will also contain in solution potassium pectate. If other alkali chromate has been used, the corresponding alkali pectate will, of course, be in solution. The amount of water in which these substances are contained will be dependent upon the amount of water used to suspend the lead pectate gel and the amount of water used to dissolve the potassium chromate added to the suspension of the gel.

In order to increase the concentration of the lead chromate with respect to the pectate, I find that it is perfectly feasible to go forward with this aqueous solution in the same manner as was done in the first place with the pectate sol. In other words, I may add to the solution of pectate containing the lead chromate in finely divided suspension 2½ parts by weight of lead acetate dissolved in the desired quantity of water. This gives me again a lead pectate gel of granular, noncontinuous structure. The lead chromate present from the first series of operations will be substantially or wholly entrapped within this gel so that I may freely drain it, suspend it in water and boil, if desired, and drain, wash further, if desired, and press without substantial loss of the originally precipitated lead chromate. I then suspend this gel in the desired water and add again preferably not more than the stoichiometric proportion of potassium chromate to react with the second quantity of lead acetate added.

This gives me a water solution which contains double the original amount of lead chromate, all in finely divided form, but only the original amount of alkali pectate. It is possible to repeat the cycle of operations again and again. However, there appears to be upon repeated recycling some tendency to form increasing quantities of larger crystals of the lead chromate and, therefore, I preferably do not carry this repetition to an extreme. This is so because in some uses of the pigment the presence of the pectate is in nowise objectionable, while for other uses it is possible to segregate and separate the pigment from the pectate solution.

Obviously, other chromates, for example, sodium chromate, can be used in place of the potassium chromate without giving a different final pigment, and other lead salts can be utilized in place of the lead acetate. An example of another lead salt which I have worked with in carrying out this same process is lead nitrate.

Neither is my process limited to the manufacture of lead salts, but it is adaptable, as far as pigments are concerned, to any type of pigments which contain a cation which forms with pectate a water-insoluble gel or "precipitate."

As an illustration of a second example, I refer to the direct formation of ferri-ferrocyanide, $Fe_4[Fe(CN)_6]_3$, or Prussian blue. For the formation of this material, I begin with 10 parts of pectate in solution and add to it a solution of 4 parts of ferric chloride. This gives me a gel of iron pectate which may be cleaned up and pressed in the same manner as described above for the lead pectate gel. The iron pectate is then suspended in water and there is added to it preferably not more than the stoichiometric proportion of the solution of potassium ferrocyanide, $K_4Fe(CN)_6$, which gives a very finely divided suspension of the desired pigment Prussian blue. In this, as in other cases also, I may build up the concentration of the pigment with respect to the pectate by adding a further quantity of ferric chloride to again cause the formation of an iron pectate gel and proceed with the cycle of operations as previously described.

Actually, the common practice in the manufacture of Prussian blue is to make the ferro-ferrocyanide and then subject this to oxidation to obtain the desired ferri-ferrocyanide. This procedure is perfectly possible with my process as outlined for making finely divided pigments. In fact, the state of very fine subdivision will be found to be an aid to rapid and complete oxidation.

Other types of metallic compounds, even though not ordinarily susceptible of use as pigments, are capable of undergoing a series of reactions analogous to those outlined above, provided that the metallic salt desired will form by a double decomposition reaction with the pectate salt employed.

Where the compound prepared is to be employed as a pigment, two general types of uses are wide-spread. One of these is in the use of calcimine type of water paints. For this use the pigments manufactured as described above will be preeminently suited at the end of the process as above described, except that ordinarily the pigments will be separated from the aqueous phase, since paints of this type are usually sold in dry, powdered form. The separation of the metallic compound from the aqueous phase in which it has been prepared can be accomplished, for example, by drying or by precipitation with any suitable precipitant, such as alcohol, followed by drying. The metallic compound in all these cases is found to be strongly colloidally protected by the pectate, which has been separated from the aqueous phase with the metallic compound. This colloidal protection is definitely desirable for the use of the compound as a pigment in a cold water paint.

Where it is desired to separate the metallic compound from the pectate, at least two avenues of operation are open. One is applicable to the case of those compounds or pigments which do not suffer from being subjected to high heats and in which there is no objection to the presence of the residue arising from the incineration of the pectate. The other is available for all of those compounds which under the conditions of relatively strong colloidal protection by the pectate will, nevertheless, be preferentially wetted by oil. In these cases the final conversion back to the soluble pectate is preferably accomplished without the addition of excesses of water. The oil is then incorporated in the mixture of pigment, pectate, and water and suitably agitated. When the pigment is wetted with the oil, the oil and water phases are then separated, retaining the pigment or the majority thereof in the oil phase.

Still a third procedure involves the utilization of oil. For this procedure the mixture of pigment and pectate is first dried as indicated above, and is then thoroughly triturated with oil. After the surfaces of the pigment particles have become thoroughly wetted with the oil, water is introduced, preferably slowly and in small quantities at first, then in somewhat larger quantities. The water functions to dissolve again the dried pectate, which will not have been wetted by the oil to any appreciable extent, and the oil and water phases are then separated.

The very finely divided pigments prepared as above indicated are suitable for use in paints or inks or any analogous application.

Compounds not suitable for pigments, which may have been prepared in accordance with the process outlined, are applied to any uses for which they are adapted.

I claim:

1. A method of making water insoluble metallic compounds in finely divided form comprising the preparation of a pectate compound in gel form by the reaction of a water soluble pectate and a water soluble salt having the cation of the desired metallic compound and then reacting the so formed pectate compound with a second water soluble salt having a cation which will form a water soluble pectate and the anion of the desired metallic compound.

2. A method of making finely divided water insoluble metallic compounds of relatively high concentration with respect to the pectate employed comprising the preparation of a pectate compound in gel form by the reaction of a water soluble pectate and a water soluble salt having the cation of the desired metallic compound and then reacting the so formed pectate compound with a second water soluble salt having a cation that will form a water soluble pectate and the anion of the desired metallic compound to regenerate the pectate in soluble form, and repeating the cycle of operations.

3. A method of making water insoluble metallic pigments in deflocculated condition and of relatively high concentration with respect to the pectate employed comprising the preparation of a pectate compound in gel form by the reaction of a water soluble pectate and a water soluble salt having the cation of the desired metallic pigment compound and then reacting the so formed pectate compound with a second water soluble salt having a cation that will form a water soluble pectate and the anion of the desired metallic pigment compound to regenerate the pectate in soluble form, and repeating the cycle of operations.

4. A method of making water insoluble metallic pigments in deflocculated condition and in finely divided form comprising the preparation of a pectate compound in gel form by the reaction of a water soluble pectate and a water soluble salt having the cation of the desired metallic pigment compound and then reacting the so formed pectate compound with a second water soluble salt having a cation that will form a water soluble pectate and the anion of the desired metallic pigment compound.

CLARENCE WALTER WILSON.